US011105828B2

(12) United States Patent
Liukku et al.

(10) Patent No.: US 11,105,828 B2
(45) Date of Patent: Aug. 31, 2021

(54) MICROELECTROMECHANICAL DEVICE FOR OUT-OF-PLANE MOTION DETECTION

(71) Applicant: MURATA MANUFACTURING CO., LTD., Nagaokakyo (JP)

(72) Inventors: Matti Liukku, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 44 days.

(21) Appl. No.: 16/512,946

(22) Filed: Jul. 16, 2019

(65) Prior Publication Data

US 2020/0018777 A1   Jan. 16, 2020

(30) Foreign Application Priority Data

Jul. 16, 2018   (FI) ..................................... 20185646

(51) Int. Cl.
  *G01P 15/125*   (2006.01)
  *G01P 15/08*   (2006.01)

(52) U.S. Cl.
  CPC .... *G01P 15/125* (2013.01); *G01P 2015/0882* (2013.01)

(58) Field of Classification Search
  CPC .................................................... G01P 15/125
  USPC ..................................................... 73/514.32
  See application file for complete search history.

(56) References Cited

U.S. PATENT DOCUMENTS

| 2008/0314147 | A1  | 12/2008 | Nasiri et al. |
| 2015/0192603 | A1  | 7/2015  | Baldasarre et al. |
| 2016/0214853 | A1  | 7/2016  | Thompson et al. |
| 2016/0305780 | A1  | 10/2016 | Comi et al. |
| 2016/0334438 | A1* | 11/2016 | Thompson ............ B81B 7/0016 |
| 2018/0073875 | A1* | 3/2018  | Anac ..................... B81B 3/0051 |

OTHER PUBLICATIONS

Finnish Search Report dated Mar. 6, 2019 corresponding to Finnish Patent Application No. 20185646.

\* cited by examiner

*Primary Examiner* — Walter L Lindsay, Jr.
*Assistant Examiner* — Philipmarcus T Fadul
(74) *Attorney, Agent, or Firm* — Squire Patton Boggs (US) LLP (57) ABSTRACT

The disclosure relates to a microelectromechanical device where the device structure includes a rotating mass structure and a linear mass structure. The rotating mass structure is formed of two rotating mass parts elastically coupled to the support through one or more springs that enable rotary motion of each of the rotating mass parts about respective rotary axes that extend parallel to each other along a first in-plane direction (IP1). The linear mass structure includes at least one elongate rigid body that extends in a second in-plane direction (IP2). One end of the linear mass structure is coupled to the first rotating mass part and the other end of the linear mass structure is coupled to the second rotating mass part such that rotary motions of the first and second masses result into linear motion of the linear mass structure in the out-of-plane direction (OP).

20 Claims, 11 Drawing Sheets

MICROELECTROMECHANICAL DEVICE FOR OUT-OF-PLANE MOTION DETECTION

FIELD OF THE DISCLOSURE

The present disclosure relates to microelectromechanical devices, and more particularly to devices configured for detecting accelerations in out-of-plane direction.

BACKGROUND OF THE DISCLOSURE

Figure 1:
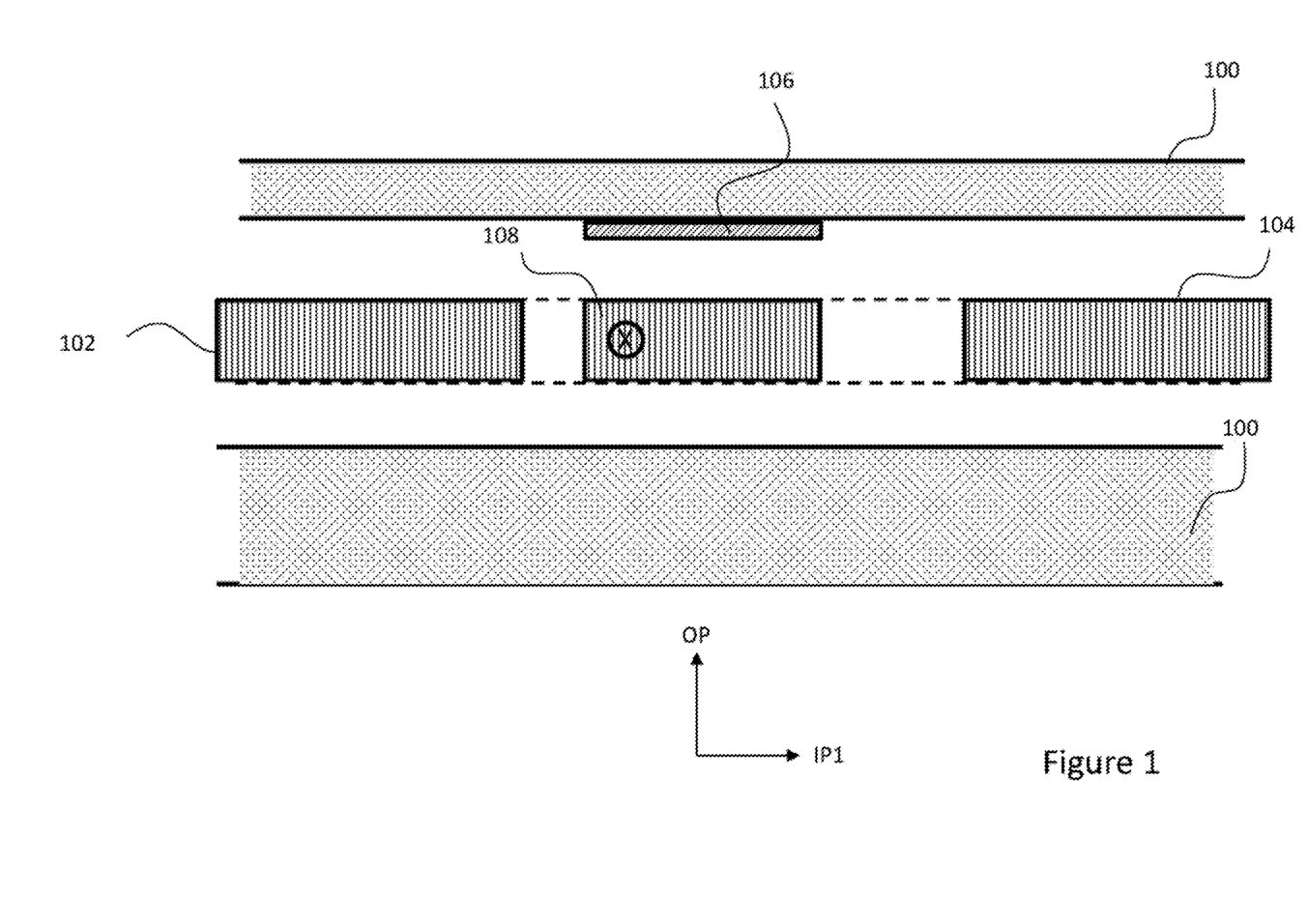
FIG. 1 shows a side view illustrating basic elements of a microelectromechanical device.

A microelectromechanical device can be made to move with an object to measure acceleration upon it. For this, the micromechanical device typically includes inertial mass structures, and acceleration forces acting on the micromechanical device can be measured by detecting displacements of these masses relative to fixed electrodes. FIG. 1 shows a side view illustrating basic elements of a microelectromechanical device.

The microelectromechanical device comprises a support 100, and a device structure 102. The term support 100 refers herein to a rigid mechanical element that may be fixed to move with the measured object. Accordingly, the support is a structural element that provides a rigid, locally inert reference for movable elements of the microelectromechanical device. Movable elements of the microelectromechanical device can be suspended through deformable elements from the support. In a wafer structure, the support may be provided by a base layer underneath and separated by an out-of-plane gap from a structure layer into which the movable or deformable elements are patterned. The support may alternatively, or additionally, be provided by a capping above and separated by an out-of-plane gap from a structure layer into which the movable or deformable elements are patterned. The support and elements in the structure layer may, for example, be coupled to each other through one or more fixing points protruding from the support. Alternatively, or additionally, the support may include a frame that is rigidly fixed to the base layer and surrounds some or all elements in the structure layer.

The term device structure 102 refers herein to a combination of rigid and flexible elements that are jointly configured to undergo a defined mode of motion induced by acceleration acting upon the microelectromechanical device. In other words, the device structure is coupled to the support such that forces by accelerations in a measured direction induce the defined mode of motion. On the other hand, displacements or deformations of the device structure, caused by accelerations in any other directions, are minimized. In the defined mode of motion, the displacements of at least part of the device structure can be capacitively detected and transformed into an electrical signal that very accurately represents the measured acceleration.

In an initial static state of the device, a plane of the device structure 102 forms a reference plane 104 for the device. The initial static state refers here to a situation where the device structure is suspended from the support, is acted upon by gravitation, but is not subject to any induced accelerations. When the device structure is a patterned element, the reference plane may be considered to align with a surface of the planar layer from which the device structure is patterned. The surface considered as the reference plane is advantageously on the side that determines the distance that separates electrodes applied capacitive detection. In the example of FIG. 1, a stator electrode 106 is in the capping, so the reference plane 104 aligns with the top surface of the device structure 102. The stator electrode 106 may alternatively be positioned in the base layer, wherein the reference plane 104 aligns with the bottom surface of the device structure.

In capacitive measurements, acceleration is detected from change in the capacitance of an inertial mass that moves with respect to a static reference. In the microelectromechanical device of FIG. 1, an inertial mass in the device structure 102 may be applied as a rotor electrode 108, and the support 100 (here the capping) may provide a stator electrode 106 for capacitive measurements. The stator electrode 106 may be patterned to protrude from the support, as shown in FIG. 1, or be partially or wholly embedded into the support 100. In a manner well known to a person skilled in the art, a pair of a stator electrode 106 and a rotor electrode 108 can be electrically coupled such that they detect a change in capacitance between them when the rotor electrode is displaced in an out-of-plane direction OP. The out-of-plane direction OP refers here to a plane that is perpendicular to the reference plane 104. Movement of the rotor electrode 108 relative to the stator electrode 106 causes a change in capacitance between them. This change can be converted into an analog voltage signal, which then through e.g. charge amplification, signal conditioning, demodulation, filtering, can be converted into digital form for further signal processing.

FIG. 1 illustrates a simplified exemplary configuration where a rotor electrode 108, when exposed to acceleration in the OP direction, moves in relation to a stator electrode 106 in a torsional mode, by pivoting in a see-saw type of motion about respective in-plane rotation axis, denoted in FIG. 1 with a crossed circle. The asymmetric seesaw structure of the rotor electrode 108 transforms detected acceleration in the out-of-plane direction into rotational movements of the torsional mode. This torsional mode is frequently applied in Z-direction (out-of-plane) sensing accelerometer components, and specifically in ones that are combined into a same device with X- or Y-direction (in-plane) sensing accelerometer components (multi-axis accelerometer). In such devices, relatively high common structure layer thickness is required, because out-of-plane parasitic resonance modes in in-plane measuring structures have to be sufficiently high in frequency. Higher structure layer thickness also gives more capacitance and higher signal level in in-plane measurement combs. Gas damping is also higher when a thicker structure layer is used.

However, structure layer thickness creates challenges in design of combined configurations where in-plane and out-of-plane detection is applied. A spring patterned into a thick structure layer is relatively loose to torsional motion but does nor deform easily in the out-of-plane direction. However, as may be understood from FIG. 1, in torsional seesaw like movement, only an outermost part of the surface area of the rotor electrode 108 becomes displaced towards the stator electrode 106. This means that areas closer to the rotation axes are not effectively used for detection. In this respect, a more advantageous mode would be transversal motion where the rotor electrode moves more or less linearly towards the stator electrode, and practically the whole surface area of the rotor electrode 108 acts as a capacitor plate. The transversal mode would give higher capacitance change compared to the torsional mode, and thereby increased signal level could be achieved with such device structure.

As another aspect, a single seesaw mass in an out-of-plane sensing accelerometer component has to be sensitive to out-of-plane linear acceleration, but in practice it is always also somewhat sensitive to some in-plane linear acceleration, depending on the orientation of the torsional springs. Conventionally undesired sensitivities have been dealt with in design by ensuring that parasitic resonances are much higher in frequency than the resonance frequency of the measurement mode. In practice, the first parasitic resonances can be made up to 10 times higher in frequency than the resonance frequency of the measurement mode. However, for some applications, even this difference is not enough. For example, sensors of automotive products operate in very vibration-rich environments and with new applications, performance requirements are continuously tightening.

The lowest parasitic modes for torsional mode of motion sensitive to out-of-plane linear acceleration are in-plane and out-of-plane rotational modes. A parasitic in-plane rotational mode relates here to rotation of the mass of the rotor electrode 108 about an axis that is perpendicular to the reference plane (Z-axis). In a single uncoupled seesaw mass of a rotor electrode 108, the in-plane rotational parasitic mode is easily excited with linear in-plane acceleration excitations. This is because the mass of the rotor electrode is typically suspended by coaxial torsion springs, and the distance between the center of mass of the rotor electrode and the axis of the torsion springs acts as a lever arm for the in-plane rotational motion. Linear vibration is usually the most severe form of undesired excitation and it is typically present in many applications.

A parasitic out-of-plane rotational mode refers here to rotation of the mass of the rotor electrode 108 about an axis that is parallel to the reference plane (X or Y-axis). It is evidently difficult to design a multi-axis accelerometer in which a mass enabled for out-of-plane torsion mode would be sensitive only to linear out-of-plane acceleration. Sensitivity to other linear accelerations could be eliminated only by positioning the center of the mass of the rotor electrode on the axis of the torsion springs. However, by doing so, one would also loose sensitivity to the out-of-plane linear accelerations.

BRIEF DESCRIPTION OF THE DISCLOSURE

An object of the present disclosure is to provide device that overcomes or at least alleviates the above described problems in design of out-of-plane detecting device structures.

The object of the disclosure is achieved by the device structure characterized by what is stated in the independent claim. The preferred embodiments of the disclosure are disclosed in the dependent claims.

The disclosure is based on the idea including in the device structure a linear mass and two rotating masses, coupled to each other in a specific manner to apply benefits of rotary modes of motion and linear modes of motion.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 2:
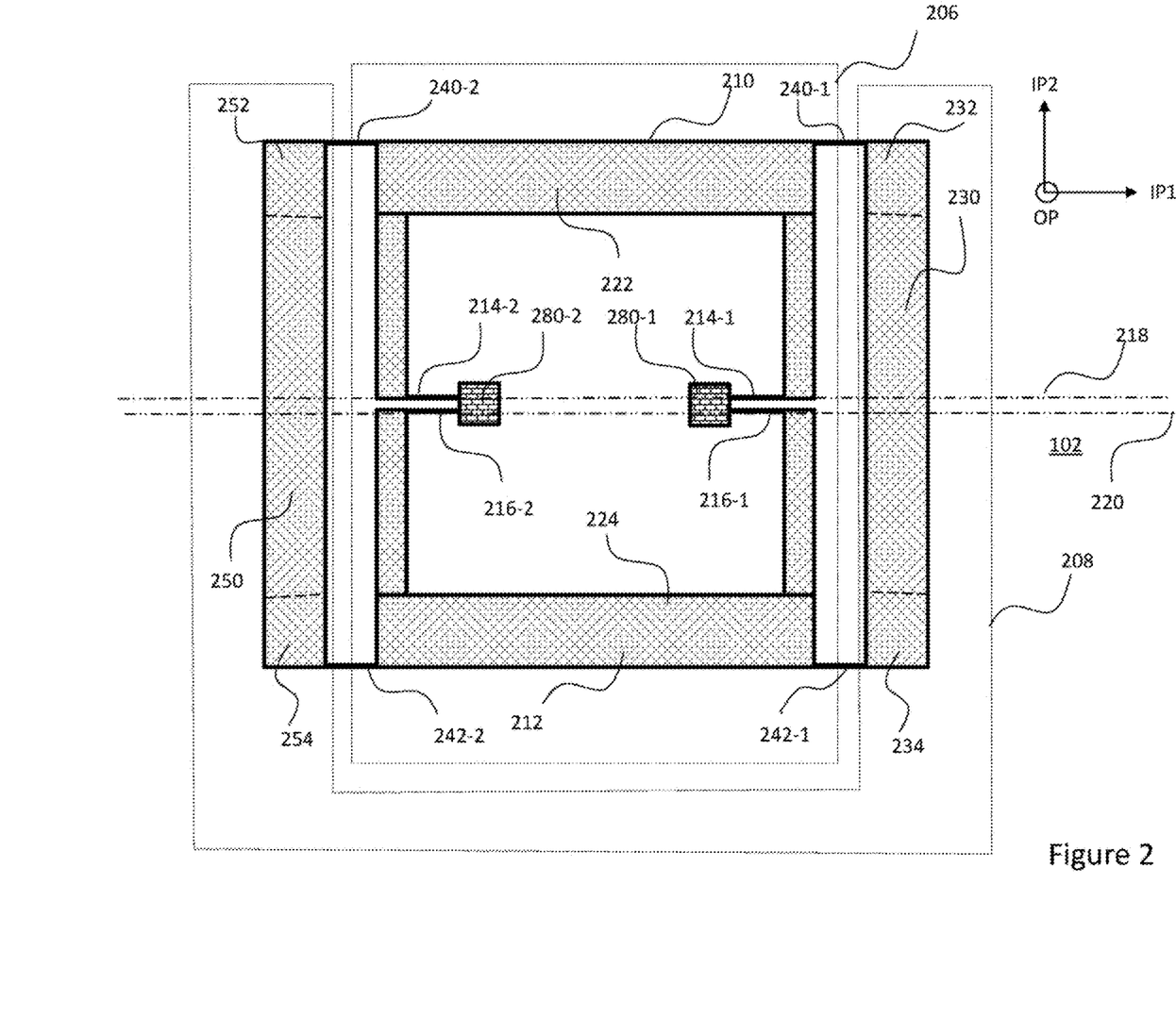
FIG. 2 shows a top view of an example device structure.

FIG. 2 shows an example of a novel structure that eliminates, or at least alleviates the above described disadvantages by combining torsional and transversal modes of motion. In the shown example, the device structure 102 includes a rotating mass structure 206 and a linear mass structure 208. The rotating mass structure 206 is formed of two separate rotating mass parts, a first rotating mass part 210 and a second rotating mass part 212. Separate in this context means that each of the two rotating mass parts 210, 212 is elastically coupled to the support 100 through an axial spring structure that is functionally separate from the spring structure of the other rotating mass part. Axial spring structure in this context means that the points of contact to the support and to the rotating mass part are aligned to a spring axis. This means that the center of mass of each of the rotating mass parts can be offset from the spring axis of its axial spring. This provides the necessary lever arm for the torsional mode of motion to be induced by acceleration in the out-of-plane direction. The two rotating mass parts can be made to extend side by side aligned to the reference plane such that in each of the two rotating mass parts, a first section of a rotating mass part extends outwards from a respective spring axis. In each of the two rotating mass parts, the first section has the largest part of the inertial mass of the rotating mass part. The axial spring structure thus establishes a rotary axis of the torsional mode for each of the rotating mass parts.

In the example of FIG. 2, the first rotating mass part 210 includes a rigid U-shaped mass element formed of an elongate horizontal mass part that extends in the first in-plane direction IP1 and couples two elongate vertical mass parts in the second in-plane direction IP2. The ends of the U-shaped mass element are elastically coupled to the support by a first spring structure 214-1, 214-2. In this example, the coupling to the support is illustrated with attachment points 280-1, 280-2, but other forms and coupling structures may be applied, as well. In this example, the first spring structure 214-1, 214-2 includes two torsional springs, each of which is enabled to twist about a torsion axis between a point of connection to an attachment point, and a point of connection to an end of the U-shaped element. The torsion axes of springs 214-1, 214-2 of the first spring structure are aligned to a line that forms a first rotary axis 218. Advantageously, the torsional springs are loose to elastically twist in the torsional mode, and are as rigid as possible against bending in any of the in-plane or out-of-plane directions. In this example, the first section 222 includes essentially the whole inertial mass of the first rotating mass part 210, other alternative configurations will be described later on.

The second rotating mass part 212 has the same form as the first rotating mass part 210, but the U-shaped mass element is oriented in opposite direction, as shown in FIG. 2. The ends of the U-shaped mass element are elastically coupled to the support through the same attachment points 280-1, 280-2 by a second spring structure 216-1, 216-2. However, as mentioned earlier, the form of the attachment to the support is not, as such, relevant for the torsional mode. The torsion axes of springs 216-1, 216-2 of the second spring structure are aligned to a line that forms a second rotary axis 220. In this example, the first rotary axis 218 and the second rotary axis 220 are separated by a non-zero distance in the second in-plane direction IP2, i.e. the in-plane direction that is perpendicular to the direction of the rotary axes.

In the disclosed arrangement the springs 214-1, 214-2 of the first spring structure couple the first rotating mass part 210 to the support and enable rotary motion of the first rotating mass part 210 about the first rotary axis 218. The springs 216-1, 216-2 of the second spring structure couple the second rotating mass part 212 to the support and enable rotary motion of the second rotating mass part 212 about the second rotary axis 220. The first rotary axis 218 and the second rotary axis 220 are in-plane axes, i.e. extend parallel to the reference plane. The first rotary axis 218 and the second rotary axis 220 are also parallel to each other, in this example they extend in the first in-plane direction IP1. In this disclosure, parallel orientation of axes means that they can be the same distance apart at every point along their whole length. The distance may also be zero, in which case the axes are aligned to one line. As mentioned earlier, the first spring structure 214-1, 214-2, and the second spring structure 216-1, 216-2 are functionally separate so that without further connecting parts, the first rotating mass part 210 and the second rotating mass part 212 could move independent of each other according to accelerations upon the device.

However, in the present device structure, motions of the first rotating mass part 210 and the second rotating mass part 212 are not separate but coupled in a specific way by the linear mass structure 208. The linear mass structure 208 includes at least one elongate rigid body that extends lengthwise in the second in-plane direction IP2. FIG. 2 shows a first rigid body 230 positioned on one side of the rotating mass structure 206 beside each of the rotating mass parts 210, 212. A section in one end of the first rigid body 230 forms a first end part 232 and a section in the opposite end of the first rigid body 230 forms a second end part 234. The term section refers herein to a lengthwise divided portion of the elongate rigid body, covering less than half of the length of the elongate rigid body.

The first end part 232 of the first rigid body 230 is coupled to the first section 222 of the first rotating mass part 210 through one or more springs 240-1. The springs 240-1 are configured to couple the first section 222 of the first rotating mass part 210 to move in the out-of-plane direction OP with the first end part 232 of the first rigid body 230. Correspondingly, the second end part 234 of the first rigid body 230 is coupled to a first section 224 of the second rotating mass part 212 through one or more springs 242-1, which are correspondingly configured to couple the first section 224 of the second rotating mass 212 part to move in the out-of-plane direction OP with the second end part 234 of the first rigid body 230. In other words, the springs 240-1, 242-1 are rigid in the out-of-plane direction OP, which is typically inherently the case if the springs and the mass parts are made of the same structure layer. Accordingly, acceleration upon the device structure in the out-of-plane direction OP causes the rotating mass parts 210, 212 to rotate about their respective rotary axes 218, 220. The circular curves of the rotary motion of the first sections 222, 224 in the rotating mass parts 210, 212 have a component in the out-of-plane direction OP, and components of motions of both of the rotating mass parts 210, 212 and motion of the first rigid body 230 are coupled. Due to symmetry of the structures, the components are essentially equal, so the resulting movement of the first rigid body 230 is linear motion in the out-of-plane direction. The linear motion reciprocates according to the balanced reciprocating motions of the two rotating mass parts 210, 212 about their respective rotary axes 218, 220.

For symmetry, in the example of FIG. 2, in addition to the first rigid body 230 disclosed above, the linear mass includes also a second rigid body 250. A first end part 252 of the second rigid body 250 is coupled to the first section 222 of the first rotating mass part 210 through one or more springs 240-2 that couple the first section 222 of the first rotating mass part 210 to move in the out-of-plane direction OP with the first end part 252 of the second rigid body 250. Correspondingly, a second end part 254 of the second rigid body 250 is coupled to a first section 224 of the second rotating mass part 212 through one or more springs 242-2 that couple the first section 224 of the second rotating mass 212 part to move in the out-of-plane direction OP with the second end part 254 of the second rigid body 250. The springs 240-1, 240-2 connected to the first section 222 of the first rotating mass part 210 can be considered as a third spring structure and the springs 242-1, 242-2 connected to the first section 224 of the second rotating mass part 212 can be considered as a fourth spring structure.

Figure 3:
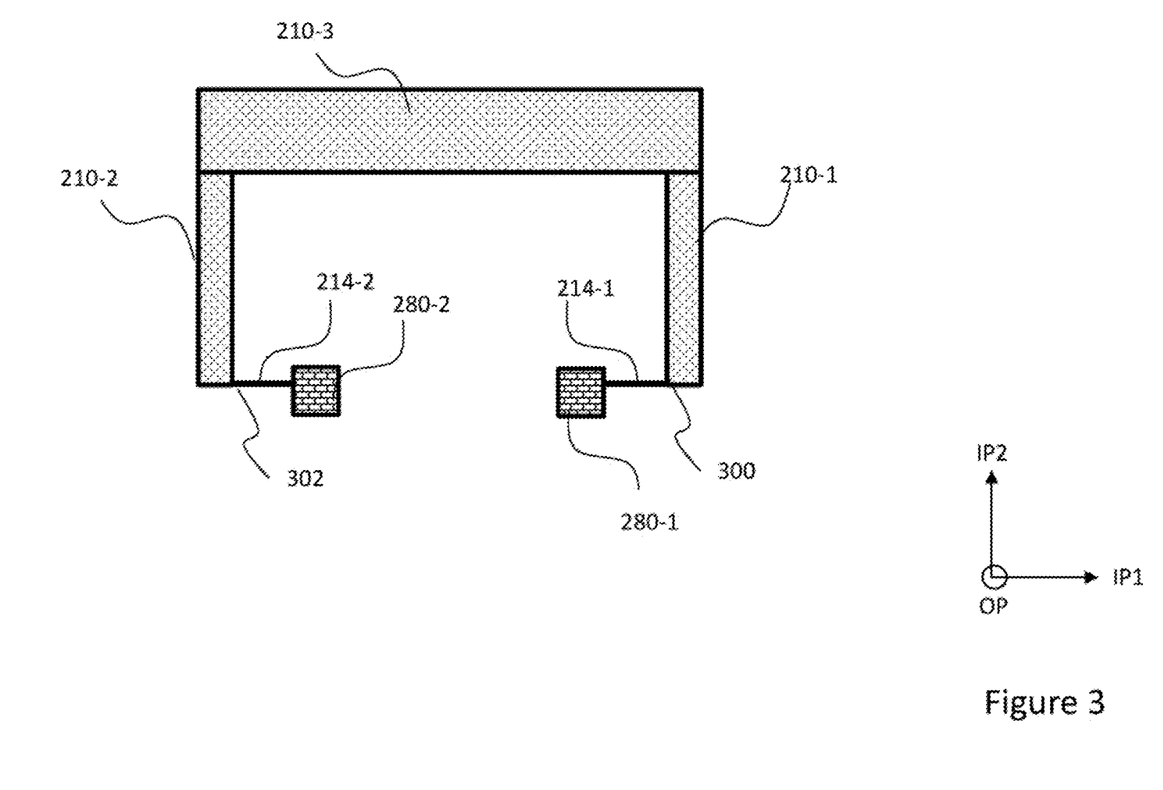
FIG. 3 shows a more detailed description of rotating mass parts.

More detailed description of the rotating mass parts is provided in FIG. 3 that shows the first rotating mass part 210 of FIG. 2. As described earlier, the first rotating mass part 210 is a U-shaped structure, formed of two elongate vertical mass parts 210-1, 210-2 that extend in the second in-plane direction IP2, and are connected by an elongate horizontal mass part 210-3 that extends in the first in-plane direction IP1. A first end of the first torsional spring 214-1 of the first spring structure is coupled to the support 100 through the attachment point 280-1. A first end of a first elongate vertical mass part 210-1 of the U-shaped element connects to the elongate horizontal mass part 210-3, and a second end of the first elongate vertical mass part 210-1 includes a side point 300 to which the second end of the first torsional spring 214-1 of the first spring structure is connected. The term side point in this context refers in general to a point in a side of a vertical mass part that is adjacent to a point of connection to the support. For example, the side point 300 is a point in a side of the first elongate vertical mass part 210-1 that faces the attachment point 280-1, and, in other words, is adjacent to it. Correspondingly, a first end of the second torsional spring 214-2 of the first spring structure is coupled to the support 100 through the attachment point 280-2. A first end of a second elongate vertical mass part 210-2 of the U-shaped element connects to the elongate horizontal mass part 210-3, and a second end of the second elongate vertical mass part 210-2 includes a side point 302 to which the second end of the second torsional spring 214-2 of the first spring structure is connected. In this configuration, the side points 300, 302 are in the ends of the vertical mass parts 210-1, 210-2, so that the distance between a side point and a respective end of the vertical mass part is zero or close to zero. Alternative configurations will be described later on.

Based on FIGS. 2 and 3 and the above description, implementation of the second rotating mass part and the second spring structure is clear to a person skilled in the art. The second rotating mass 212 part is coupled to the support through springs 216-1, 216-2 of the second spring structure. First end of each vertical mass part of the second rotating mass part 212 is connected to its horizontal mass part. A first end of a first torsional spring 216-1 of the second spring structure is coupled to the support 100 through the attachment point 280-1, and a second end of the first torsional spring 216-1 of the second spring structure is coupled to a side point in a second end of a first vertical mass part of the second rotating mass part 212. Correspondingly, a first end of a second torsional spring 216-2 of the second spring structure is coupled to the support 100 through the attachment point 280-2, and a second end of the second torsional spring 216-2 of the second spring structure is coupled to a side point in a second end of a second vertical mass part of the second rotating mass part 212. Each of the first torsional spring 216-1 and the second torsional spring 216-2 are configured to twist about a torsion axis. Torsion axes of these torsional springs 216-1, 216-2 of the second spring structure are aligned to the rotary axis 220 of the second rotating mass part 212.

It can now be noted that in the disclosed configuration, the center of mass of each of the rotating mass parts 210, 212 is offset from the respective rotary axis. Furthermore, springs of the spring structures can flex torsionally even if they were made of a thicker structure layer, and therefore be rigid in the out-of-plane direction OP. Accordingly, linear acceleration in the out-of-plane direction OP upon the device structure can efficiently transform into rotary motions of the two reversely rotating mass parts 210, 212. It is possible to capacitively detect these rotary motions with a static electrode positioned above and/or below the rotating mass structure. However, now also the considerable area of the linearly moving linear mass structure, which is coupled to move with out-of-plane motion of the rotating mass parts can be used for capacitive detection. The additional area of the linear mass structure makes the configuration capable to produce significantly larger detection signals. Furthermore, even if the requirement of asymmetry is fulfilled, the center of mass of the device structure is ideally in the point of symmetry of the coupled linear and rotating mass structures, and is therefore at, or in the immediate vicinity of the rotary axes of the rotating mass parts. Furthermore, as each of the rotating mass parts couples to the support through two coaxial torsional springs, and both of the rotating mass parts couple through spring structures to opposite ends of each elongate rigid body of the linear mass structure, the structure is highly balanced and very strongly resists in-plane rotation (rotation of the structure about an axis in the out-of-plane direction OP). This means that linear accelerations upon the device structure in the in-plane directions IP1, IP2 have very little leverage to transform into in-plane rotational movement. The balanced configuration is thus very robust against the most frequently occurring, and thus very harmful parasitic in-plane accelerations.

Figure 4:
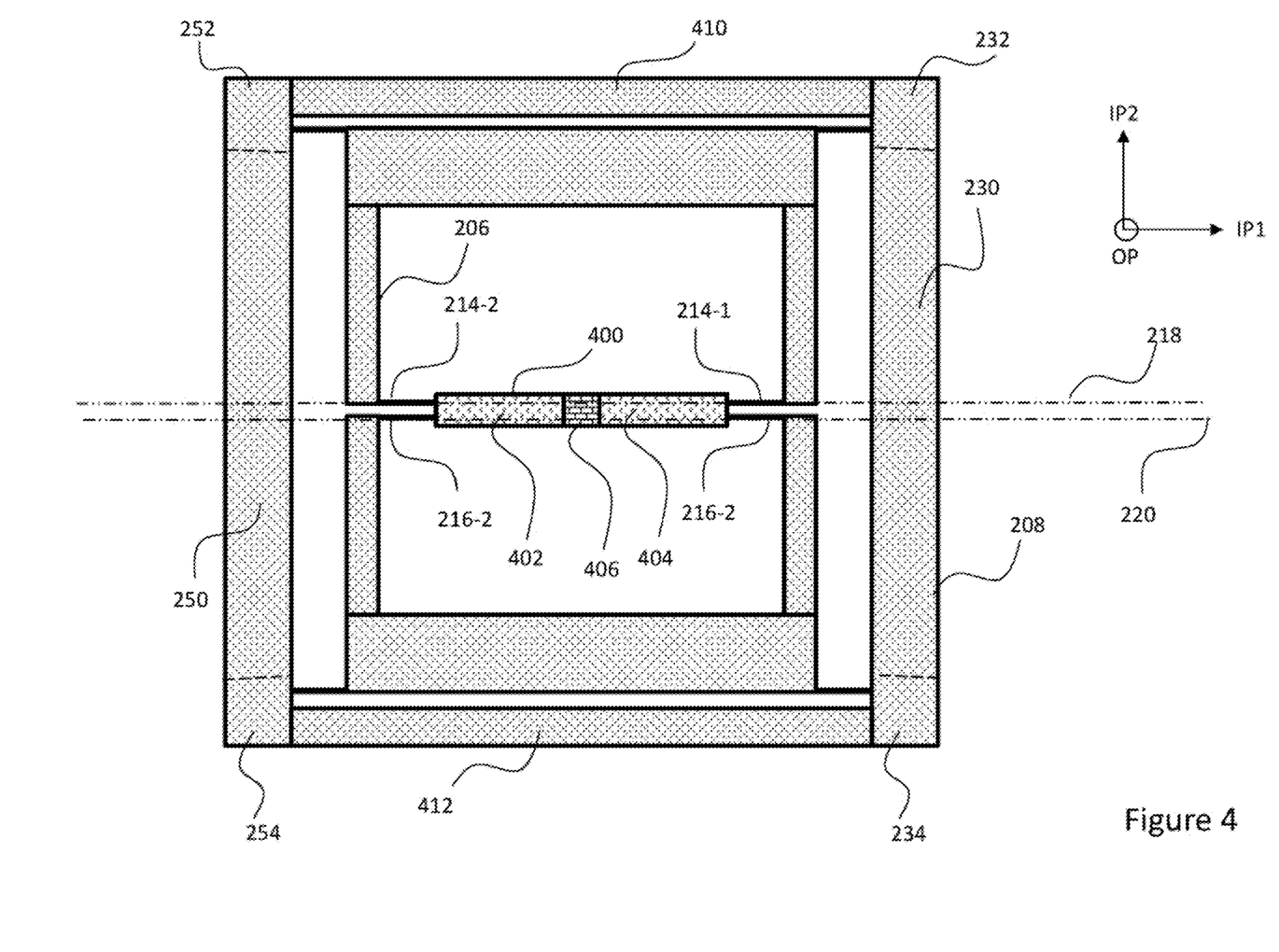
FIG. 4 illustrates an alternative example for the device structure.

FIG. 4 illustrates another example for the device structure of the improved microelectromechanical device. Description for parts similar to the parts in FIG. 2 may also be referred from description thereof. The device structure of FIG. 4 includes the rotating mass structure 206 and the linear mass structure 208 but, as a first aspect, shows an alternative configuration for attaching the rotating mass parts to the support. Instead of a set of two attachments points, the device includes an elongate attachment structure 400 to which first ends of the torsional springs 214-1, 214-2 of the first spring structure and first ends of the torsional springs 216-1, 216-2 of the second spring structure attach. The attachment structure may include an attachment point 406 that is fixed to the support, for example by establishing a firm mechanical connection between the supporting layer and the structure layer of the device. In order to eliminate parasitic vibrations, the attachment point 406 may be made to extend laterally in the direction of the rotary axes through two rigid support structures 402, 404. The rigid support structures do not need to be mechanically coupled to the underlying layer but can be solidly coupled to the attachment point 406, and thereby provide a stable fastening point to the torsional springs. An advantage of this alternative support configuration is that temporal structural variations (due to e.g. changes in temperature, humidity, etc.) that tend to deflect designed dimensions of the device have an effect on the capacitive detection through variations of one point only.

FIG. 4 illustrates also an alternative form for the linear mass structure. In the configuration of FIG. 4, the first end part 232 of the first rigid body 230 and the first end part 252 of the second rigid body 250 is coupled by a third rigid body 410 that extends along the reference plane in the first in-plane direction IP1. Correspondingly, the second end part 234 of the first rigid body 230 and the second end part 254 of the second rigid body 250 is coupled by a fourth rigid body 412 that also extends along the reference plane in the first in-plane direction IP1. The four rigid bodies 230, 250, 410, 412 form a rigid frame that moves linearly in the out-of-plane direction according to rotational out-of-plane motion of the rotating mass parts. The frame structure provides added inertial mass and even more area for capacitive detection, and at the same time reinforces the rigidity of the linearly moving part, and thereby increases robustness against external shocks and vibrations during operation.

Angular momentum of a rotating mass is proportional to the mass and radius of rotation of the mass. Advantageously the radius of rotation, here essentially defined by the distance from the centre of the mass of the inertial masses in motion to the respective rotation axis, needs to be large enough to facilitate applicable response to the experienced accelerations. The volume of each rotating mass part can be concentrated to its outer edge, leaving free space between the outer edge and the rotary axis. This requirement facilitates compact configuration for a multi-axis accelerometer device etched from one structure layer area. The term 'multi-axis' in this context means that the device is configured to generate a signal in response to accelerations in two or more directions.

Figure 5:
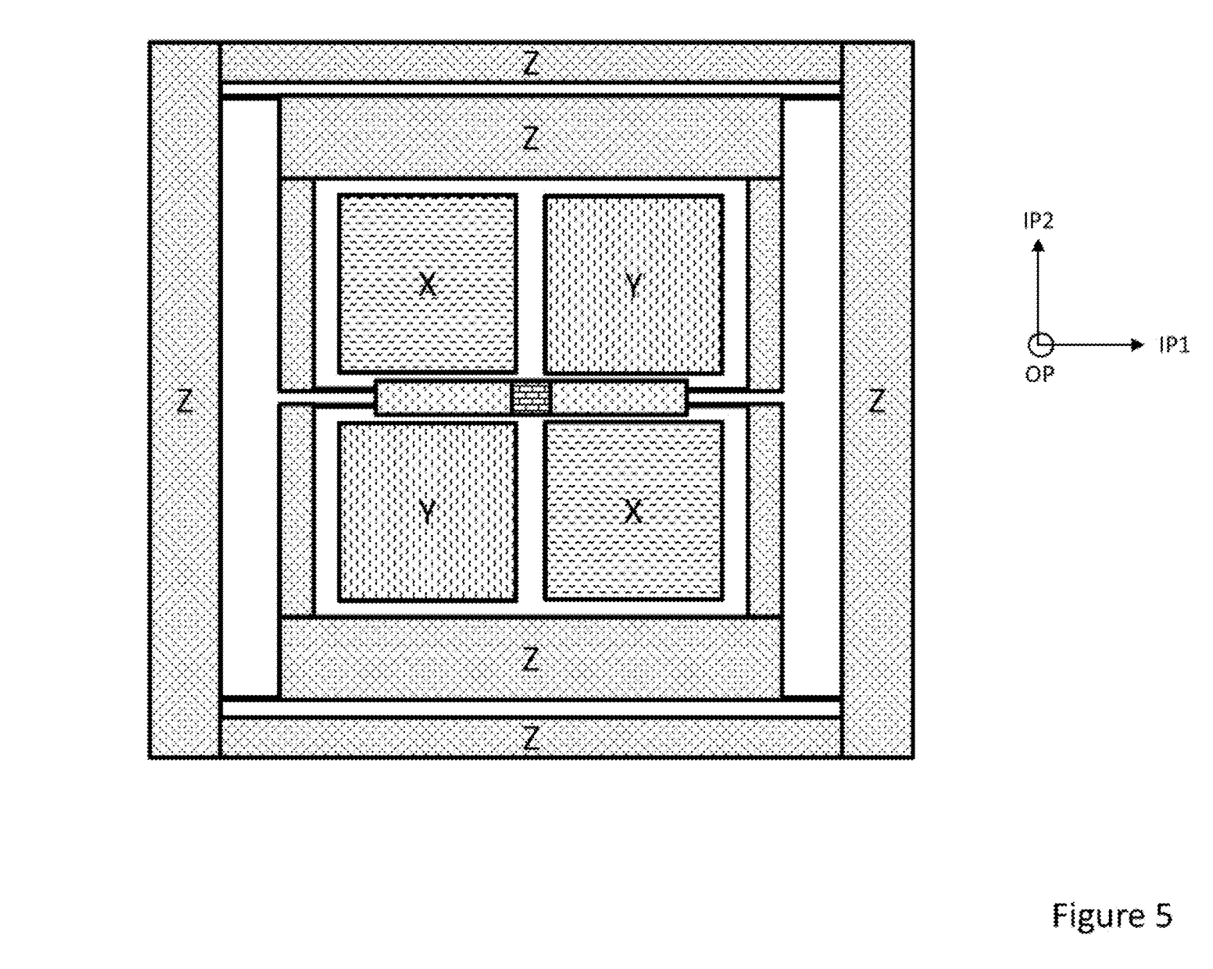
FIG. 5 illustrates the elements of FIG. 4 combined with elements applicable for detection in other directions.

FIG. 5 illustrates the elements of FIG. 4, denoted with Z to indicate that the parts of the device structure are applicable for detection of accelerations in the out-of-plane direction OP. FIG. 5 shows also two X-elements denoted with X to indicate parts of the device structure applicable for detection of accelerations in the first in-plane direction IP1, and two Y-elements denoted with Y to indicate the parts of the device structure applicable for detection of accelerations in the second in-plane direction IP2.

Figure 6A:
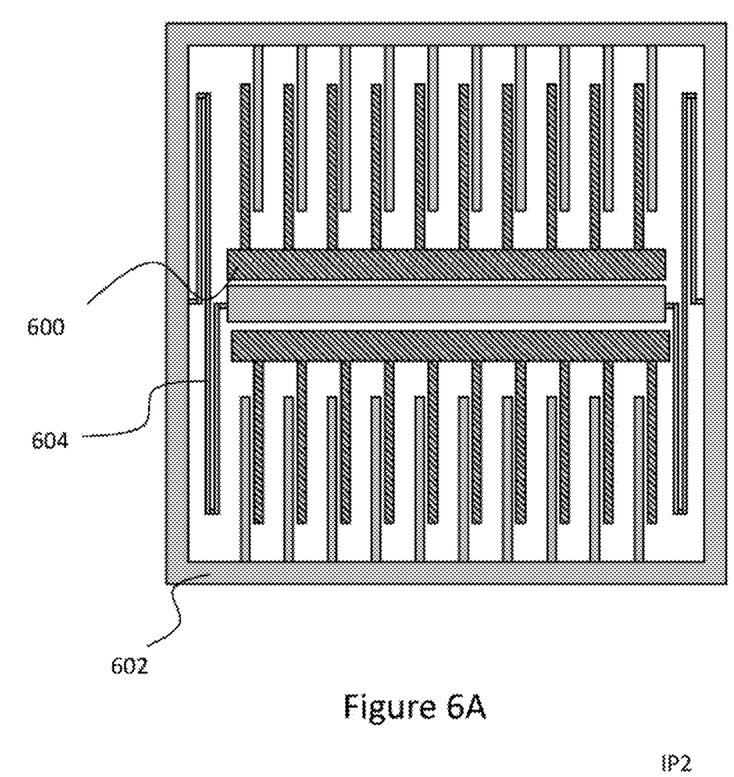
FIGS. 6A and 6B illustrate exemplary structures for elements applicable for detection in other directions.
Figure 6B:
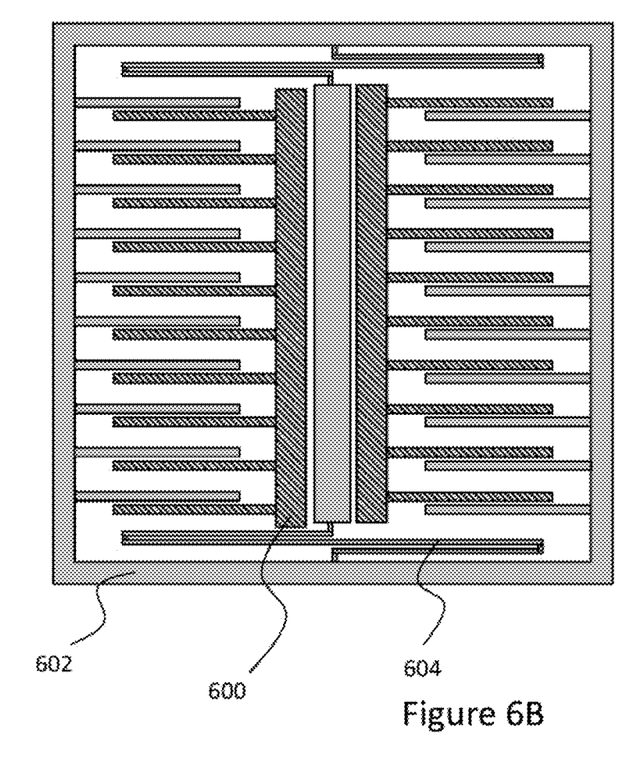

The internal configuration of X- and Y-elements is not relevant to the invention, as such. However, FIGS. 6A and 6B illustrate exemplary structures for X-elements and Y-elements, respectively. Each of the elements in FIGS. 6A and 6B show a stator structure 600 and a rotor structure 602. The stator structure 600 is rigidly fastened to the support and includes a comb structure wherein comb fingers extend in an in-plane direction that is perpendicular to the direction in which the element senses accelerations. The rotor structure 602 is suspended from the support by means a spring structure 604 that is elastic to enable motion of the rotor structure in the sensed direction and is as rigid as possible to other modes of motion. The rotor structure 602 thus includes a comb structure wherein comb fingers also extend in the direction that is perpendicular to the sensed direction. The comb fingers of the stator structure 600 are interdigitated with the comb fingers of the rotor structure 602. When acceleration in the sensed direction falls upon the element, the rotor structure moves, changing the distance between adjacent stator and rotor comb fingers. This change creates a capacitive signal that represents the sensed acceleration. As shown in FIG. 6A, the sensed direction of the X-element is the first in-plane direction IP1, and in FIG. 6B, the sensed direction of the Y-element is the second in-plane direction IP2.

Figure 7:
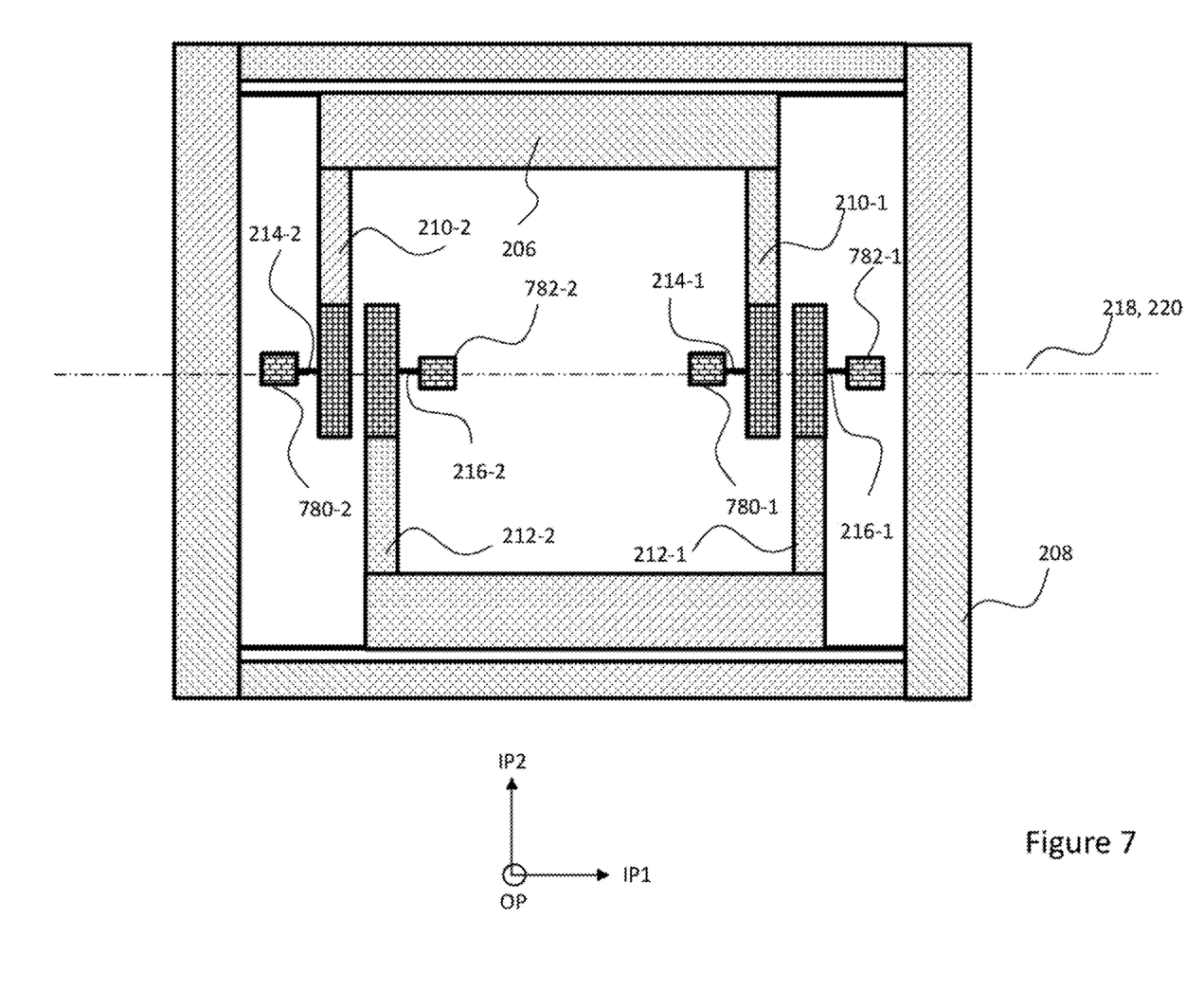
FIG. 7 illustrates an alternative example for the device structure.

Micromechanical device structures are typically surrounded by gas, with which the moving parts interact when in motion. Closed air gap heights between a device layer and the patterned support (capping and base) may be different and the thin films make it necessary to carefully consider damping effects of such gaps for operation. In a device structure, which is enclosed between a base and a capping to sense accelerations in the out-of-plane direction OP, and either of both of the base and the capping is patterned, it is often difficult to provide gas damping symmetrically from both sides of the structure. FIG. 7 illustrates an embodiment that enables symmetric gas damping when the rotating mass parts move in the positive out-of-plane direction and when the rotating mass parts move in the negative out-of-plane direction, even if damping occurs only on one side of the rotating mass part.

In FIG. 7, description for parts similar to the parts in FIG. 2 may also be referred from description thereof. The device structure of FIG. 7 includes the rotating mass structure 206 and the linear mass structure 208 but, as a first aspect, shows a further alternative configuration for attaching the rotating mass parts to the support. Instead of a set of two attachments points, the device includes now two sets of attachment points 780-1, 780-2 and 782-1, 782-2 to which first ends of the torsional springs 214-1, 214-2, 216-1, 216-2 of the first spring structure and the second spring structure attach. In this example, the rotary axis 218 of the first rotating mass part and the rotary axis 220 of the second rotating mass part are aligned to a same line. The congruence of the rotary axes 218, 220 serves to enable extending the vertical mass parts beyond the common rotary axis. It should be noted that the disclosed use of two sets of attachment points may be applied with other configurations shown in this description, also with ones where the axes are not aligned to the same axis.

As in FIG. 4, the vertical mass parts include side points to which the torsional springs attach. However, each side point is separated by a non-zero distance from the second end of its respective vertical mass part. More specifically, the first end of the a first torsional spring 214-1 of the first spring structure is coupled to the support through the first attachment point 780-1, and the second end is coupled to a side point in the first vertical mass part 210-1 of the first rotating mass part. The first end of the second torsional spring 214-2 of the first spring structure is coupled to the support through the second attachment point 780-2, and the second end is coupled to a side point in the second vertical mass part 210-2 of the first rotating mass part. The first end of the first torsional spring 216-1 of the second spring structure is coupled to the support through the third attachment point 782-1, and the second end is coupled to a side point in the first vertical mass part 212-1 of the second rotating mass part. The first end of the second torsional spring 216-2 of the second spring structure is coupled to the support through the fourth attachment point 782-2, and the second end is coupled to a side point in the second vertical mass part 212-2 of the second rotating mass part. Each side point is separated by a non-zero distance from the second end of its respective vertical mass part. In FIG. 7, for each vertical mass part, a section of the vertical mass part that extends beyond its respective rotary axis, and a section of the vertical mass parts symmetric with respect of the rotary axis are marked with different pattern.

Figure 8:
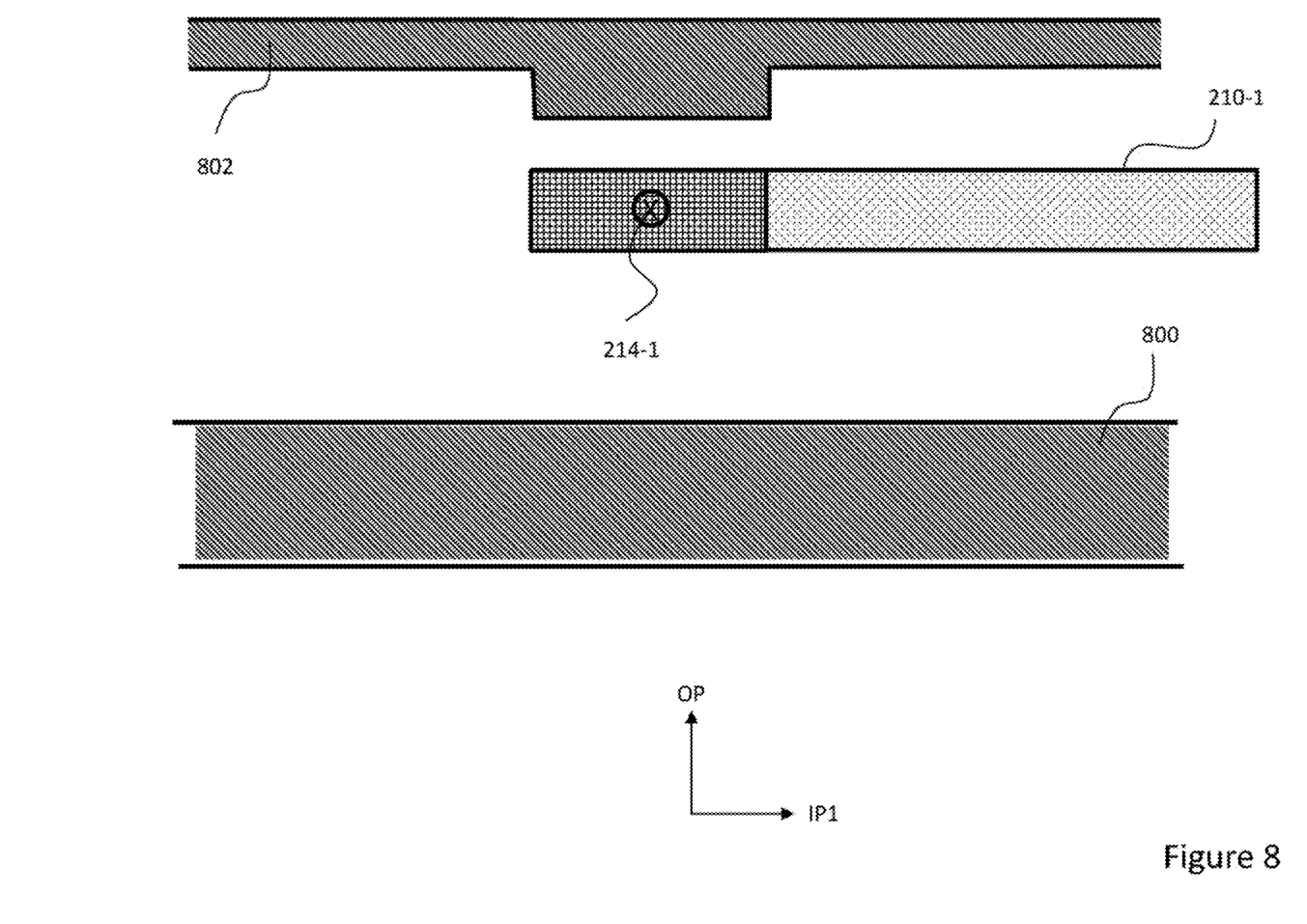
FIG. 8 shows a detail of coupling and arrangement of damping film thicknesses.

FIG. 8 shows a detail of the coupling and arrangement of damping film thicknesses of FIG. 7 with a simplified side view of the first vertical mass part 210-1. The rotary axis of the first torsional spring 214-1 is coupled to the support via an attachment point (not shown), and the rotary axis 218 of the torsional spring 214-1 is marked with X. The device structure may be enclosed between two support layers (here a base 800 and a capping 802), of which one of the support layers (in this example the base 800) is for functional requirements of the total structure farther away from the device structure. In such cases, the film thickness between the farther support layer and the device structure of FIG. 4 would not provide gas damping when the rotating mass part 210 moves away from the capping 802. The device structure of FIG. 7 avoids this problem by extending the vertical mass parts beyond the rotating axis. The support layer closer to the device structure (in the example of FIG. 4 the capping 802) can then be profiled so that it provides an equal gap thickness for the section of the vertical mass part that extends beyond the rotary axis, and for the symmetric section of the vertical mass part. Through this arrangement, gas damping can be provided symmetrically in both directions of the rotary motion. The arrangement also enables use of differential detection. Capacitance from the section of the vertical mass part that extends beyond the rotary axis can be measured in parallel with capacitance from the symmetric section of the vertical mass part. When signals of these capacitances are used differentially, offset from possible deformations of the device structure is eliminated.

Figure 9:
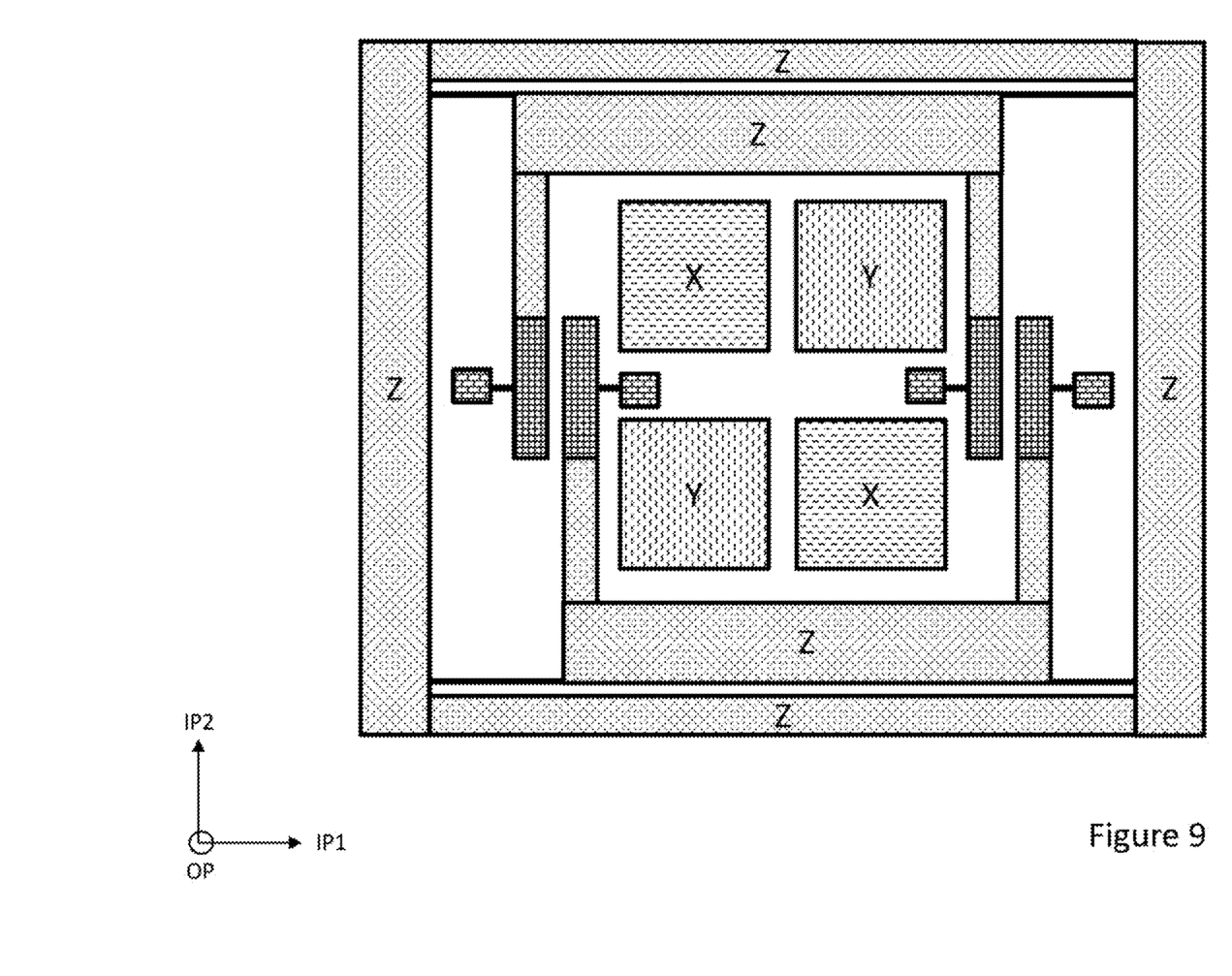
FIG. 9 illustrates the elements of FIG. 7 combined with elements applicable for detection in other directions.

As shown in FIG. 9, symmetrical gas damping of FIG. 7 can be provided without compromising the possibility to implement multi-axis sensing through elements of one device structure. FIG. 9 illustrates the elements of FIG. 7, denoted with Z to indicate that the parts of the device structure are applicable for detection of accelerations in the out-of-plane direction OP. FIG. 9 shows also two X-elements denoted with X to indicate parts of the device structure applicable for detection of accelerations in the first in-plane direction IP1, and two Y-elements denoted with Y to indicate the parts of the device structure applicable for detection of accelerations in the second in-plane direction IP2.

Figure 10:
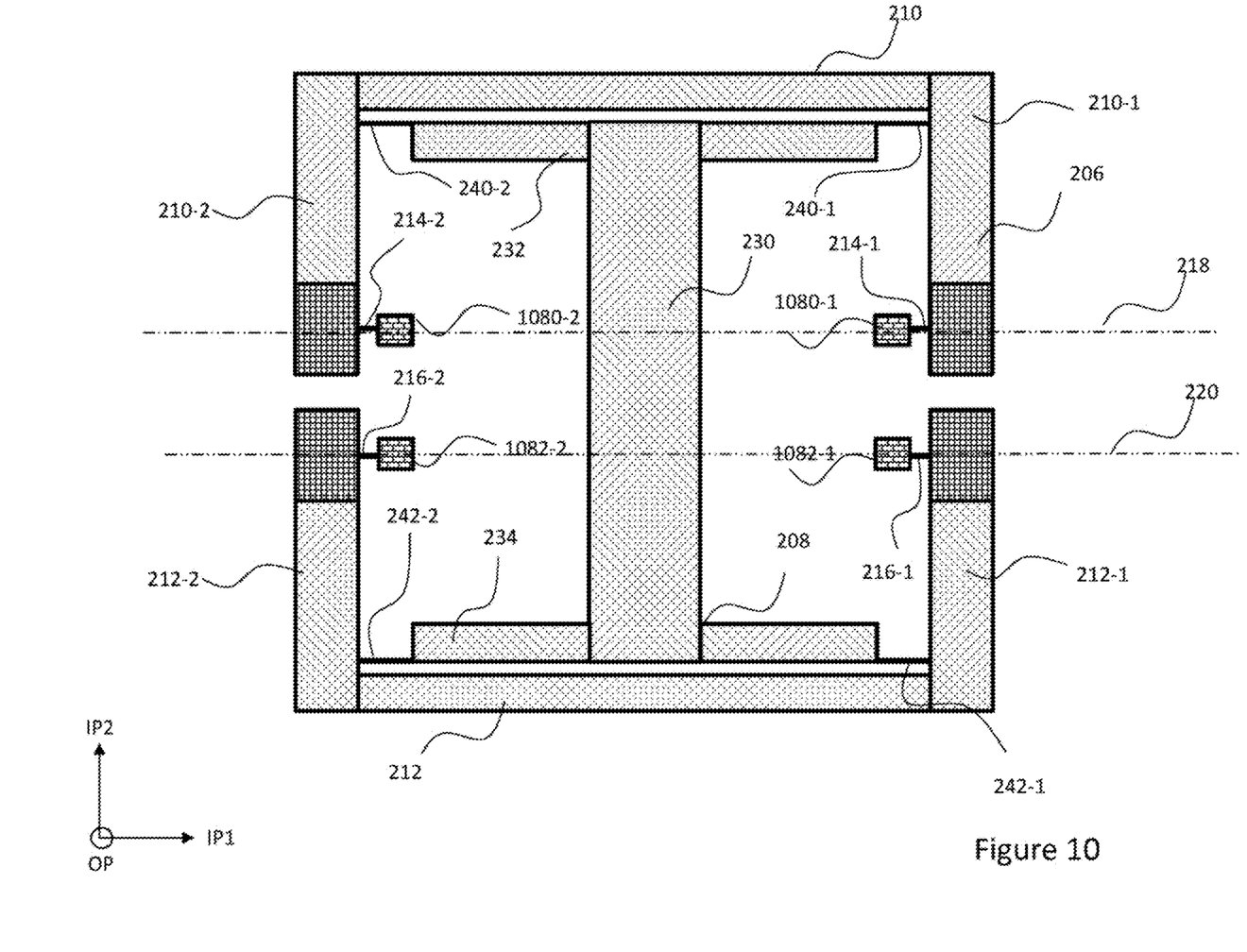
FIG. 10 illustrates an alternative example for the device structure.

FIG. 10 shows a further embodiment that illustrates an alternative configuration for the linear mass part and another way to enable symmetric gas damping with the rotating mass parts. It should be noted that these aspects are not mandatory to each other, but are easily applied, separately or in combination, as alternatives in any of the earlier described structures by a person skilled in the art.

In FIG. 10, description for parts similar to the parts in FIG. 2 may again be referred from description thereof. The device structure of FIG. 10 includes the rotating mass structure 206 and the linear mass structure 208 but this time the linear mass structure includes only one rigid body 230 that is disposed into the enclosure formed by the U-shaped rotating mass parts 210, 212. The rigid body 230 extends in the second in-plane direction IP2 in the reference plane. The first end part 232 and the second end part 234 in opposite ends of the rigid body 230 are also elongate elements that extend in the first in-plane direction IP1 in the reference plane. The first section of the rotating mass part 210 is coupled to the first end part 232 of the rigid body 230 through springs 240-1, 240-2 that couple said first section to move in the out-of-plane direction OP with the first end part 232 of the rigid body 230. The first section of the rotating mass part 212 is similarly coupled to the second end part 234 of the rigid body 230 through springs 242-1, 242-2. The springs couple the first section of the second rotating mass part 212 to move in the out-of-plane direction OP with the second end part 234 of the rigid body 230. Through the symmetric combination of the rotary motions of the rotating mass parts 210, 212, the rigid body 230 is induced to linear motion in the out-of-plane direction.

As a first aspect, FIG. 10 shows yet a further alternative configuration for attaching the rotating mass parts to the support. Instead of a set of two attachments points, the device includes now two sets of attachment point pairs 1080-1, 1080-2 and 1082-1, 1082-2 to which first ends of the torsional springs 214-1, 214-2, 216-1, 216-2 of the first spring structure and the second spring structure attach. In this example, the rotary axis 218 of the first rotating mass part and the rotary axis 220 of the second rotating mass part are separated by a non-zero distance, symmetrically disposed with relation to the center of mass of the device structure. In this configuration, the separation of the rotary axes 218, 220 serves to enable extending the vertical mass parts beyond the respective rotary axes. It should be noted that the disclosed use of two sets of attachment points may be applied also with other configurations shown in this description.

As in FIG. 4, the vertical mass parts of the rotating mass parts 210, 212 include side points to which the torsional springs attach. However, each side point is separated by a non-zero distance from the second end of its respective vertical mass part. More specifically, the first end of the a first torsional spring 214-1 of the first spring structure is coupled to the support through the first attachment point 1080-1, and the second end is coupled to a side point in the first vertical mass part 210-1 of the first rotating mass part. The first end of the second torsional spring 214-2 of the first spring structure is coupled to the support through the second attachment point 1080-2, and the second end is coupled to a side point in the second vertical mass part 210-2 of the first rotating mass part. The first end of the first torsional spring 216-1 of the second spring structure is coupled to the support through the third attachment point 1082-1, and the second end is coupled to a side point in the first vertical mass part 212-1 of the second rotating mass part. The first end of the second torsional spring 216-2 of the second spring structure is coupled to the support through the fourth attachment point 1082-2, and the second end is coupled to a side point in the second vertical mass part 212-2 of the second rotating mass part. Each side point is separated by a non-zero distance from the second end of its respective vertical mass part. For each vertical mass part, a section of the vertical mass part that extends beyond its respective rotary axis, and a section of the vertical mass parts symmetric with respect of the rotary axis are marked with different pattern. These patterned sections can be used to provide gas damping symmetrically in both out-of-plane directions during rotary motions of the rotating mass parts, and to provide differential out-of-plane capacitive detection.

Figure 11:
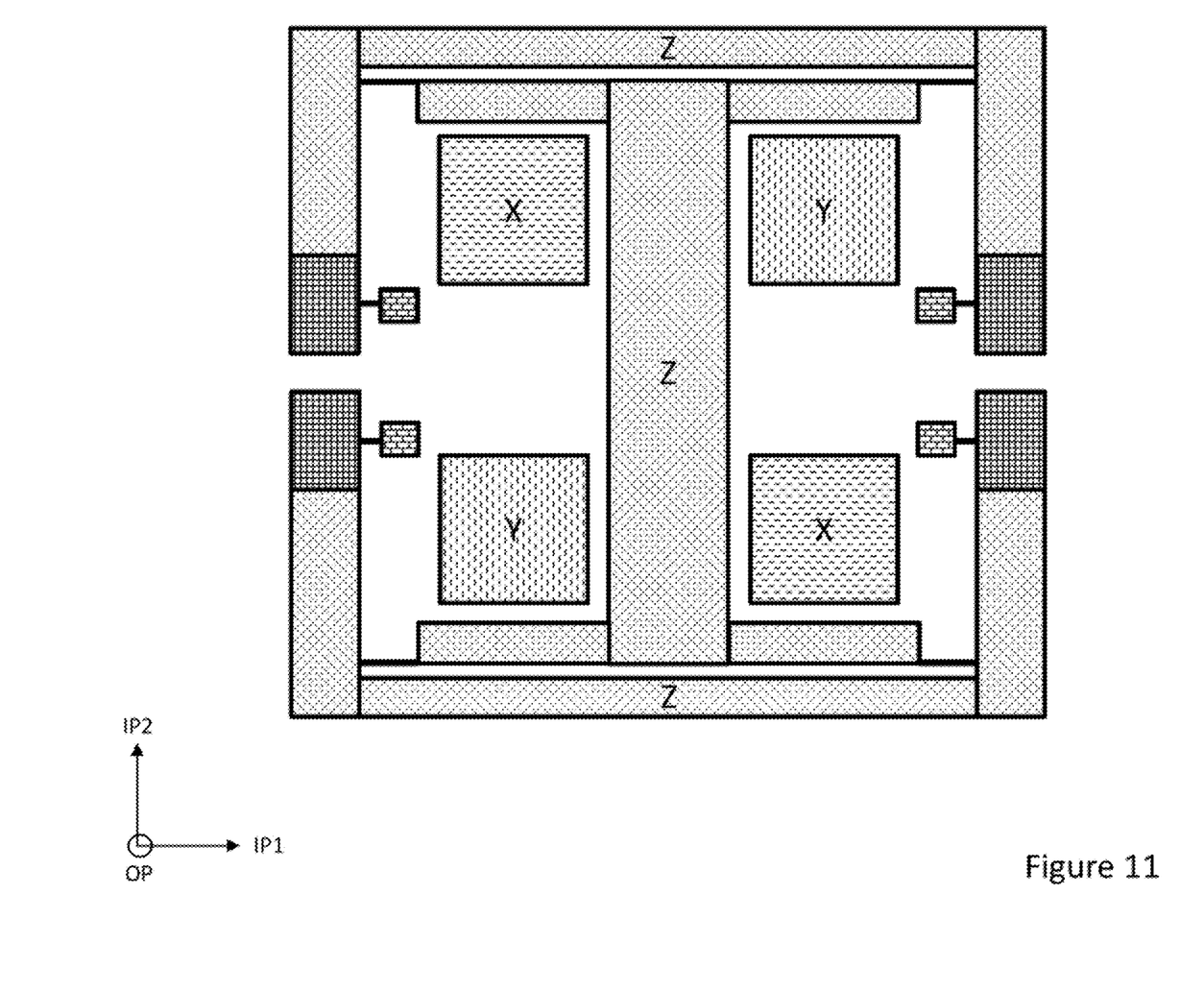
FIG. 11 illustrates the elements of FIG. 10 combined with elements applicable for detection in other directions.

FIG. 11 illustrates a multi-axis implementation, in which a signal of out-of-plane sensing is generated with the elements of FIG. 10. Said elements are denoted with Z to indicate that the parts of the device structure are applicable for detection of accelerations in the out-of-plane direction OP. FIG. 11 shows also two X-elements denoted with X to indicate parts of the device structure applicable for detection of accelerations in the first in-plane direction IP1, and two Y-elements denoted with Y to indicate the parts of the device structure applicable for detection of accelerations in the second in-plane direction IP2.

The invention claimed is:

1. A microelectromechanical device including
a support;
a device structure that is flexibly coupled to the support; wherein
in an initial static state of the device, the device structure forms a reference plane for the device;
the support provides one or more stator electrodes and the device structure provides corresponding rotor electrodes configured for capacitive detection of acceleration in an out-of-plane direction that is perpendicular to the reference plane,
the device structure includes a rotating mass structure and a linear mass structure;
the rotating mass structure is formed of two rotating mass parts, a first rotating mass part and a second rotating mass part;
the two rotating mass parts extend side by side in the reference plane such that in each of the two rotating mass parts, a first section of a rotating mass part extends outwards from a respective rotary axis;
in each of the two rotating mass parts, the first section has the largest part of the inertial mass of the rotating mass part;
the first rotating mass part is coupled to the support through a first spring structure and the second rotating mass part is coupled to the support through a second spring structure;
each of the first spring structure and the second spring structure includes two torsional springs;
a first end of a first torsional spring of the first spring structure is coupled to the support, a second end of the first torsional spring of the first spring structure is coupled to a first rotating mass part, a first end of a second torsional spring of the first spring structure is coupled to the support, a second end of the second torsional spring of the first spring structure is coupled to the first rotating mass part and the first and second torsional springs of the first spring structure are configured to twist about a first torsion axis;
a first end of a first torsional spring of the second spring structure is coupled to the support, a second end of the first torsional spring of the second spring structure is coupled to a second rotating mass part, a first end of a second torsional spring of the second spring structure is coupled to the support, a second end of the second torsional spring of the second spring structure is coupled to the second rotating mass part and the first and second torsional springs of the second spring structure are configured to twist about a second torsion axis;
the first torsion axis of the first and second torsional springs of the first spring structure is aligned to a rotary axis of the first rotating mass part;
the second torsion axis of the first and second torsional springs of the second spring structure is aligned to a rotary axis of the second rotating mass part;
the linear mass structure includes a first elongate rigid body and a second elongate rigid body, each of which extends in a second in-plane direction that is perpendicular to a first in-plane direction in the reference plane;

in each of the two elongate rigid bodies, a section in one end of the elongate rigid body forms a first end part and a section in the opposite end of the elongate rigid body forms a second end part;

a first end part of the first elongate rigid body and a first end part of the second elongate rigid body are coupled through a third spring structure to the first section of the first rotating mass part and a second end part of the first elongate rigid body and a second end part of the second elongate rigid body are coupled through a fourth spring structure to the first section of the second rotating mass part such that rotary motions of the first and second rotating mass parts transform into linear motion of the two elongate rigid bodies in the out-of-plane direction.

2. The microelectromechanical device of claim 1, wherein each of the first rotating mass part and the second rotating mass part has a U-shaped form, formed of two elongate vertical mass parts that extend in the second in-plane direction, each connected at a first end by an elongate horizontal mass part that extends in the first in-plane direction.

3. The microelectromechanical device according to claim 2, wherein the second end of the first torsional spring of the first spring structure is coupled to a side point in a first vertical mass part of the first rotating mass part;

the second end of the second torsional spring of the first spring structure is coupled to a side point in a second vertical mass part of the first rotating mass part;

the second end of the first torsional spring of the second spring structure is coupled to a side point in a first vertical mass part of the second rotating mass part;

the second end of the second torsional spring of the second spring structure is coupled to a side point in a second vertical mass part the second rotating mass part.

4. The microelectromechanical device according to claim 3, wherein each side point is in a second end of its respective vertical mass part.

5. The microelectromechanical device according to claim 3, wherein each side point is separated by a non-zero distance from the second end of its respective vertical mass part.

6. The microelectromechanical device according to claim 1, wherein the rotary axis of the first rotating mass part and the rotary axis of the second rotating mass part are separated by a non-zero distance in a direction that is perpendicular to the direction of the rotary axes.

7. The microelectromechanical device according to claim 1, wherein the rotary axis of the first rotating mass part and the rotary axis of the second rotating mass part are aligned to a same line.

8. The microelectromechanical device according to claim 1, wherein each of the third spring structure and the fourth spring structure includes two springs;

a first spring of the third spring structure couples the first end part of the first elongate rigid body to a connection point in the first section of the first rotating mass part;

a second spring of the third spring structure couples the first end part of the second elongate rigid body to a connection point in the first section of the first rotating mass part;

a first spring of the fourth spring structure couples the second end part of the first elongate rigid body to a connection point in the first section of the second rotating mass part;

a second spring of the fourth spring structure couples the second end part of the second elongate rigid body to a connection point in the first section of the second rotating mass part;

the connection points in the first section of the first rotating mass part have the same distance from the rotary axis of the first rotating mass part such that the first section of the first rotating mass part is coupled to move in the out-of-plane direction with motions of the first elongate rigid body and the second elongate rigid body;

the connection points in the first section of the second rotating mass part have the same distance from the rotary axis of the second rotating mass part such that the first section of the second rotating mass part is coupled to move in the out-of-plane direction equally with motions of the first elongate rigid body and the second elongate rigid body.

9. The microelectromechanical device according to claim 1, wherein a structure formed of a combination of the rotating mass structure and the linear mass structure is centrally symmetric.

10. The microelectromechanical device according to claim 9, wherein a point of inversion of the centrally symmetric structure coincides with the centre of gravity of the structure.

11. The microelectromechanical device according to claim 10, wherein first ends of the first and second torsional springs of the first spring structure, and first ends of the first and second torsional springs of the second spring structure attach to a common elongate attachment structure.

12. The microelectromechanical device according to claim 11, wherein the elongate attachment structure includes an attachment point fixed to the support and two laterally extending rigid support structures that are not fixed to the support.

13. The microelectromechanical device according to claim 1, wherein the first end part of the first elongate rigid body and the first end part of the second elongate rigid body are coupled by a third elongate rigid body that extends along the reference plane in the first in-plane direction;

the second end part of the first elongate rigid body and the second end part of the second elongate rigid body are coupled by a fourth elongate rigid body that extends along the reference plane in the first in-plane direction;

the rigid bodies form a rigid frame that moves linearly in the out-of-plane direction according to rotational out-of-plane motion of the rotating mass parts.

14. A microelectromechanical device including a support;

a device structure that is flexibly coupled to the support; wherein in an initial static state of the device, the device structure forms a reference plane for the device;

the support provides one or more stator electrodes and the device structure provides corresponding rotor electrodes configured for capacitive detection of acceleration in an out-of-plane direction that is perpendicular to the reference plane, the device structure includes a rotating mass structure and a linear mass structure;

the rotating mass structure is formed of two rotating mass parts, a first rotating mass part and a second rotating mass part;

the two rotating mass parts extend side by side in the reference plane such that in each of the two rotating mass parts, a first section of a rotating mass part extends outwards from a respective rotary axis;

in each of the two rotating mass parts, the first section has the largest part of the inertial mass of the rotating mass part;

the first rotating mass part is coupled to the support through a first spring structure and the second rotating mass part is coupled to the support through a second spring structure;

each of the first spring structure and the second spring structure includes two torsional springs;

a first end of a first torsional spring of the first spring structure is coupled to the support, a second end of the first torsional spring of the first spring structure is coupled to a first rotating mass part, a first end of a second torsional spring of the first spring structure is coupled to the support, a second end of the second torsional spring of the first spring structure is coupled to the first rotating mass part and the first and second torsional springs of the first spring structure are configured to twist about a first torsion axis;

a first end of a first torsional spring of the second spring structure is coupled to the support, a second end of the first torsional spring of the second spring structure is coupled to a second rotating mass part, a first end of a second torsional spring of the second spring structure is coupled to the support, a second end of the second torsional spring of the second spring structure is coupled to the second rotating mass part, and the first and second torsional springs of the second spring structure are configured to twist about a second torsion axis;

the first torsion axis of the torsional springs of the first spring structure is aligned to a rotary axis of the first rotating mass part;

the second torsion axis of the torsional springs of the second spring structure is aligned to a rotary axis of the second rotating mass part;

the linear mass structure includes an elongate rigid body extending in a second in-plane direction that is perpendicular to a first in-plane direction in the reference plane;

in the elongate rigid body, a section in one end of the elongate rigid body forms a first end part and a section in the opposite end of the elongate rigid body forms a second end part;

a first end part of the elongate rigid body is coupled through a third spring structure to the first section of the first rotating mass part and a second end part of the elongate rigid body is coupled through a fourth spring structure to the first section of the second rotating mass part such that rotary motions of the first and second rotating mass parts transform into linear motion of the elongate rigid body in the out-of-plane direction.

15. The microelectromechanical device of claim 14, wherein each of the first rotating mass part and the second rotating mass part has a U-shaped form, formed of two elongate vertical mass parts that extend in the second in-plane direction, each connected at a first end by an elongate horizontal mass part that extends in the first in-plane direction.

16. The microelectromechanical device according to claim 14, wherein the rotary axis of the first rotating mass part and the rotary axis of the second rotating mass part are separated by a non-zero distance in a direction that is perpendicular to the direction of the rotary axes.

17. The microelectromechanical device according to claim 14, wherein
the second end of the first torsional spring of the first spring structure is coupled to a side point in a first vertical mass part of the first rotating mass part;
the second end of the second torsional spring of the first spring structure is coupled to a side point in a second vertical mass part of the first rotating mass part;
the second end of the first torsional spring of the second spring structure is coupled to a side point in a first vertical mass part of the second rotating mass part;
the second end of the second torsional spring of the second spring structure is coupled to a side point in a second vertical mass part the second rotating mass part.

18. The microelectromechanical device according to claim 17, wherein each side point is separated by a non-zero distance from the second end of its respective vertical mass part.

19. The microelectromechanical device according to claim 14, wherein
each of the third spring structure and the fourth spring structure includes two springs;
a first spring of the third spring structure couples the first end part of the elongate rigid body to a connection point in the first section of the first rotating mass part;
a second spring of the third spring structure couples the first end part of the elongate rigid body to a connection point in the first section of the first rotating mass part;
a first spring of the fourth spring structure couples the second end part of the elongate rigid body to a connection point in the first section of the second rotating mass part;
a second spring of the fourth spring structure couples the second end part of the elongate rigid body to a connection point in the first section of the second rotating mass part;
the connection points in the first section of the first rotating mass part have the same distance from the rotary axis of the first rotating mass part such that the first section of the first rotating mass part is coupled to move in the out-of-plane direction with motions of the elongate rigid body;
the connection points in the first section of the second rotating mass part have the same distance from the rotary axis of the second rotating mass part such that the first section of the second rotating mass part is coupled to move in the out-of-plane direction equally with motions of the elongate rigid body.

20. The microelectromechanical device according to claim 14, wherein a structure formed of a combination of the rotating mass structure and the linear mass structure is centrally symmetric, and
wherein a point of inversion of the centrally symmetric structure coincides with the centre of gravity of the structure.

* * * * *